United States Patent
Christiano et al.

[19]

[11] Patent Number: 6,139,179
[45] Date of Patent: Oct. 31, 2000

[54] EXTRUDER SCREW HAVING MULTI-CHANNELED BARRIER SECTION

[75] Inventors: John P. Christiano, Old Lyme; Michael R. Thompson, Groton, both of Conn.

[73] Assignee: Davis-Standard Corporation, Pawcatuck, Conn.

[21] Appl. No.: 09/390,391

[22] Filed: Sep. 3, 1999

[51] Int. Cl.[7] .................................................. B29B 7/42
[52] U.S. Cl. .................................. 366/80; 366/88; 366/89
[58] Field of Search .......................... 366/79, 81, 88–90, 366/323, 80; 425/204, 208, 209

[56] References Cited

U.S. PATENT DOCUMENTS

| | | | |
|---|---|---|---|
| 3,650,652 | 3/1972 | Dray et al. ............................. | 425/208 |
| 3,698,541 | 10/1972 | Barr ....................................... | 425/208 |
| 4,000,884 | 1/1977 | Chung . | |
| 4,015,832 | 4/1977 | Kruder . | |
| 4,125,333 | 11/1978 | Fields ..................................... | 366/79 |
| 4,128,341 | 12/1978 | Hsu ........................................ | 366/89 |
| 4,173,417 | 11/1979 | Kruder .................................... | 366/323 |
| 4,277,182 | 7/1981 | Kruder . | |
| 4,341,474 | 7/1982 | Wheeler, Jr. et al. . | |
| 4,798,472 | 1/1989 | Chan et al. . | |
| 4,944,906 | 7/1990 | Colby et al. ............................ | 366/88 |
| 4,963,033 | 10/1990 | Huber et al. ........................... | 366/323 |
| 5,004,352 | 4/1991 | Tamura et al. ......................... | 366/79 |
| 5,035,509 | 7/1991 | Kruder .................................... | 366/90 |
| 5,219,590 | 6/1993 | Kruder et al. . | |
| 5,244,373 | 9/1993 | Capelle et al. ......................... | 425/208 |
| 5,288,223 | 2/1994 | Toro . | |
| 5,375,992 | 12/1994 | Kruder et al. . | |
| 5,599,097 | 2/1997 | Christie ................................... | 366/88 |
| 5,599,098 | 2/1997 | Christie ................................... | 366/90 |

*Primary Examiner*—Charles E. Cooley
*Attorney, Agent, or Firm*—McCormick, Paulding & Huber LLP

[57] ABSTRACT

An axially elongated extruder screw includes a screw body having an axially extending extruding portion defined by a feed section at an inlet end of the screw, a metering section at an outlet end of the screw and a barrier section between the feed and metering sections. A first helical primary flight extends continuously about and is coaxial with the screw body substantially along the entire length of the extruder screw. A second helical primary flight extends continuously at least part-way along the feed section to the outlet end of the extruder screw. The barrier section of the extruder screw defines first and second barrier flights positioned between the primary flights and cooperating therewith to form first and second melt and solids channels that extend along the barrier section of the extruder screw.

8 Claims, 4 Drawing Sheets

EXTRUDER SCREW HAVING MULTI-CHANNELED BARRIER SECTION

FIELD OF THE INVENTION

The present invention is generally related to machinery for processing solid resinous material, and is more specifically directed to extruder machines for mixing and melting said resinous material.

BACKGROUND OF THE INVENTION

Extruder screws employed in the melting, mixing, and compounding of polymeric resinous material typically employ three zones, namely a feed zone, a metering zone, and a melting zone located between the feed and metering zones. Typically the extruder screw is positioned for rotation in an extruder barrel that includes a hopper section adjacent to the feed section of the screw, and a discharge end opposite the hopper section and proximate to the metering section of the screw. During operation, solid resinous material is introduced through the hopper section and presented to the feed zone of the screw where it begins to melt. The solid resinous material is then conveyed to the melting zone where it melts at a greater rate than in the feed zone and is ultimately completely converted to a molten state. From the melting zone, the molten material is transferred to the metering zone for conveyance to a discharge end of the extruder where the material typically passes through a die.

Historically, conventional extruder screws comprised a single helical flight disposed about and cooperating with a root or body section of the screw to form a channel along which the resinous material introduced into the extruder was conveyed. As the material entered the melting section it began to melt due to the heat created by friction within the material itself, and heat from an external source conducted through the barrel. The molten material forms a melt film that adheres to an inner surface of the extruder barrel. When the film thickness exceeds the clearance between the extruder barrel and the flight, the leading edge of the flight scrapes the melt film off the inner surface of the barrel causing the molten material to form a pool along an advancing edge of the flight. As the material continues to melt, the solid mass normally referred to as the solids bed in the channel breaks into agglomerations of solid material which then intermix with the pool of molten material.

When this occurs, the amount of solid material exposed to the heated barrel is severely diminished since the solid material is in the form of agglomerations entrained in the pool of molten material. Therefore, in order to melt the entrained solid material, sufficient heat must transfer through the molten pool to the solids. Since most polymers have good insulating properties, the melting efficiency of the extruder declines once the solids bed has broken up.

In an effort to improve melting efficiency, extruder screws were developed that incorporated a second flight in the melting section that extended about the body portion of the screw and defined a solids channel between an advancing surface of the second flight and a retreating surface of the primary flight. In addition, a melt channel for conveying molten material was also formed between a retreating surface of the second flight, and an advancing surface of the primary flight. The diameter of the root or body section of the screw progressively increased in the solids channel, thereby reducing the channel's depth along the melt section, and decreased along the melt channel, thereby increasing the melt channel's depth. During operation, the melt film formed at the interface between the solid bed and the heated barrel surface would migrate over the second flight into the melt channel thereby minimizing the break-up of the solid bed.

In screws of this type the rate at which the solid material melted was determined by the surface area of the solid bed in contact with the heated barrel wall and the thickness of the melt film formed between the barrel wall and the solid bed. An increase in the surface area of the solid material in contact with the barrel wall caused an increase in the melting rate due to improved heat transfer from the barrel to the exposed surface of the solid bed. However, an increase in the thickness of the melt film between the solids bed and the barrel, acted as a thermal insulator, thereby reducing the heat transfer from the barrel to the solid material and slowing the rate of melting. Accordingly, to transform the solid resinous material to a molter state, the melt section of these extruder screws was quite long, which in turn resulted in increased cost both to manufacture and operate an extruder utilizing such a screw.

Based on the foregoing, it is a general object of the present invention to provide an extruder screw that overcomes the problems and drawbacks of prior art screws.

It is a more specific object of the present invention to provide an extruder screw wherein the solid material introduced into the screw is melted and mixed in an efficient manner.

SUMMARY OF THE INVENTION

The present invention resides in an axially elongated extruder screw that includes a screw body and an axially extending extruder portion. The extruder portion is defined by three zones or sections, namely, a feed section at an inlet end of the extruder screw, a metering section at an outlet end of the screw, and a barrier section between the feed and metering sections. A first helical primary flight continuously extends from and is coaxial with the screw body substantially along the entire length of the extruder screw and includes a first advancing surface and a first retreating surface. A second helical primary flight also extends continuously from the screw body at least part-way along the feed section and then along the remaining length of the extruder screw and includes a second advancing surface and a second retreating surface.

The screw body defines a first helical surface of revolution positioned between and cooperating with the first advancing and second retreating surfaces to define a first solids channel. The screw body also includes a second helical surface of revolution located between the second advancing and first retreating surfaces. The second advancing and first retreating surfaces cooperate with the second helical surface of revolution to define a second solids channel. The first and second solids channels extend at least along the length of the barrier section of the extruder screw.

In the preferred embodiment of the present invention, the barrier section includes a first barrier flight having a third advancing and a third retreating surface, extending about and coaxial with the screw body along the length of the barrier section. The first barrier flight is positioned between the first advancing and second retreating surfaces thereby causing the first helical surface of revolution to be redefined between the third advancing and second retreating surfaces. As a result of the first barrier flight, the screw body defines a third helical surface of revolution between and cooperating with the first advancing and third retreating surfaces to form a first melt channel extending along the barrier section.

A second barrier flight having a fourth advancing and a fourth retreating surface, also extends about and is coaxial with the screw body along the barrier section. The second barrier flight is positioned between the second advancing surface of the second primary flight and the first retreating surface of the first primary flight thereby causing the second helical surface of revolution to be redefined between the fourth advancing and first retreating surfaces.

The second barrier flight also facilitates the creation of a fourth helical surface of revolution between the second advancing and fourth retreating surfaces and cooperates therewith to form a second melt channel extending along the barrier section. Preferably the pitch of the first and second primary flights, as well as the pitch of the first and second barrier flights varies at least along the length of the barrier section. In the preferred embodiment of the present invention this variation in pitch results in the width of the solids channels decreasing, and the width of the melt channels increasing in a downstream direction along the barrier section. This allows the quantity of solids in the solids channels, which decreases along the barrier section in the downstream direction to contact the heated extruder barrel and melt. Conversely, the increasing width of the melt channels accommodates the increasing amounts of molten material being transferred therein.

In addition to the variations in the widths of the melt and solids channels, the depths defined by these channels also vary. For example, the depths of the solids channels decrease in the downstream direction along the barrier section to assure that the ever decreasing quantities of solid resinous material therein, is properly shears and exposed to the heated extruder barrel, thereby facilitating melting of the material. In addition, the depths of the melt channels increases on the downstream direction along the barrier section in order to adequately contain the increasing amounts of molten material.

The present invention also resides in an extruder that includes an extruder drive to which the above-described extruder screw is rotatably coupled. An extruder barrel that includes an elongated axial bore adapted to accept the extruder screw is also mounted to the drive. The extruder barrel includes a hopper section adjacent to the feed section of the extruder screw for facilitating the feeding of solid resinous material into the extruder. The axial bore is defined by a bore wall that in turn defines a plurality of axial grooves extending around the feed section of the extruder screw for increasing the feed rate and pressure of the solid resinous material being advanced in the downstream direction along the feed section.

DETAILED DESCRIPTION OF THE PREFERRED EMBODIMENTS OF THE PRESENT INVENTION

Figure 1:
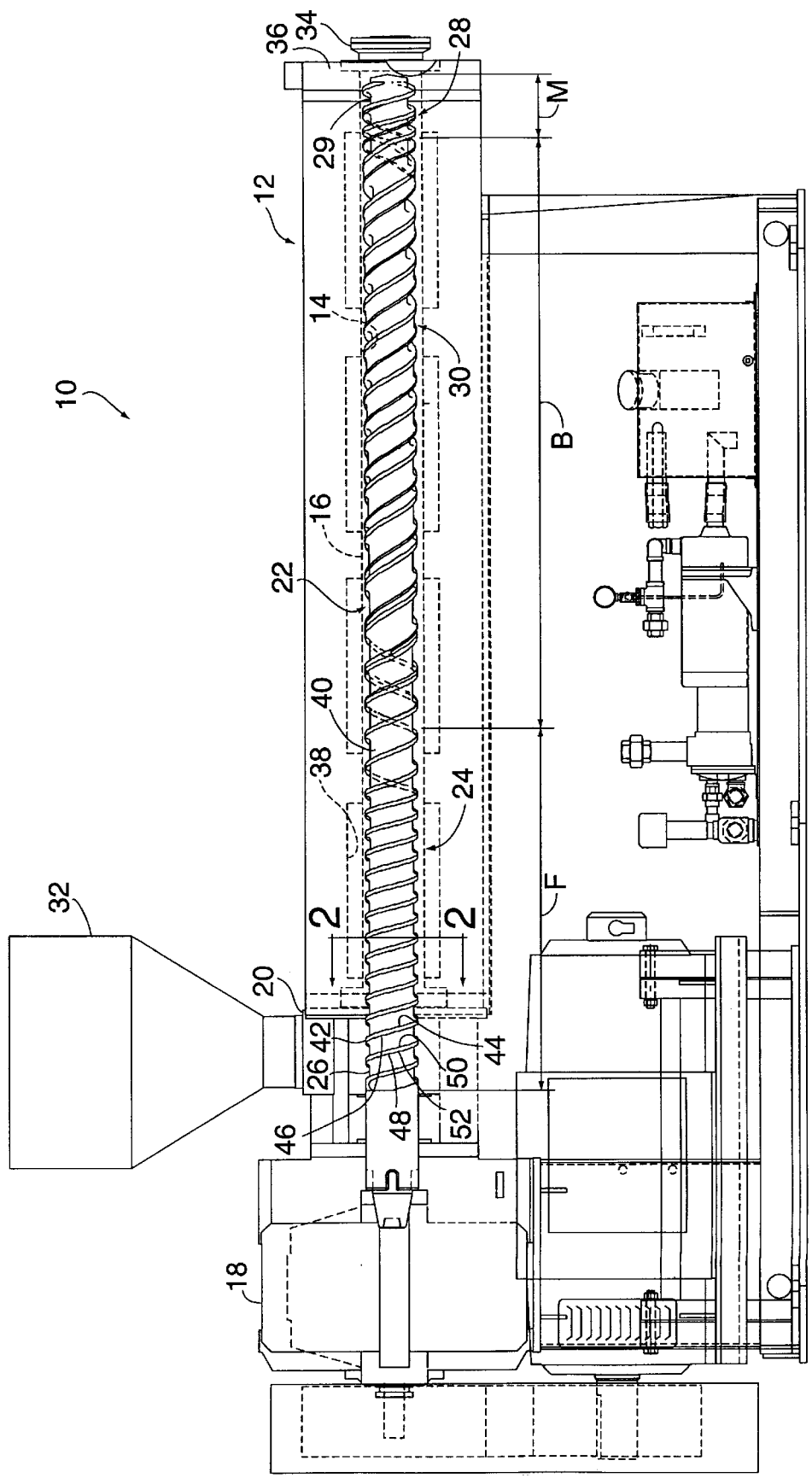
FIG. 1 is a side elevational, cross-sectional view of an extruder employing an extruder barrel and screw in accordance with the present invention.

As shown in FIG. 1, an extruder generally designated by the reference number 10 includes a barrel 12 having a bore 14 defined by a generally cylindrical bore wall 16, shown in dotted lines. The barrel 12 is mounted to a suitable drive such as, but not limited to a gearbox 18 and includes a hopper section 20 attached to the barrel adjacent to the gearbox. An axially elongated extruder screw 22 is positioned within the bore 14 and rotatably coupled to the gearbox 18. The extruder screw 22 is divided into three zones or sections, namely; a feed section 24, indicated by the dimension labeled "F" and located at an inlet end 26 of the extruder screw, a metering section 28 indicated by the dimension labeled "M" and located at an outlet end of the extruder screw; and a barrier section 30 indicated by the dimension labeled "B" and positioned between the feed and metering sections.

During operation, solid resinous material is introduced into the hopper section 20 of the extruder barrel 12 through a feed hopper 32. The solid resinous material is advanced along the feed section 24 of the extruder screw 22 where it begins to melt, and into the barrier section 30. As explained in detail hereinbelow, the solid resinous material is converted into a molten state as it is advanced along the barrier section 30 and is then fed into the metering section 28 defined by the extruder screw 22. Once in the metering section 28, the molten material is advanced out of the extruder, usually through a die 34 mounted onto an outlet end 36 of the barrel 12.

Figure 2:
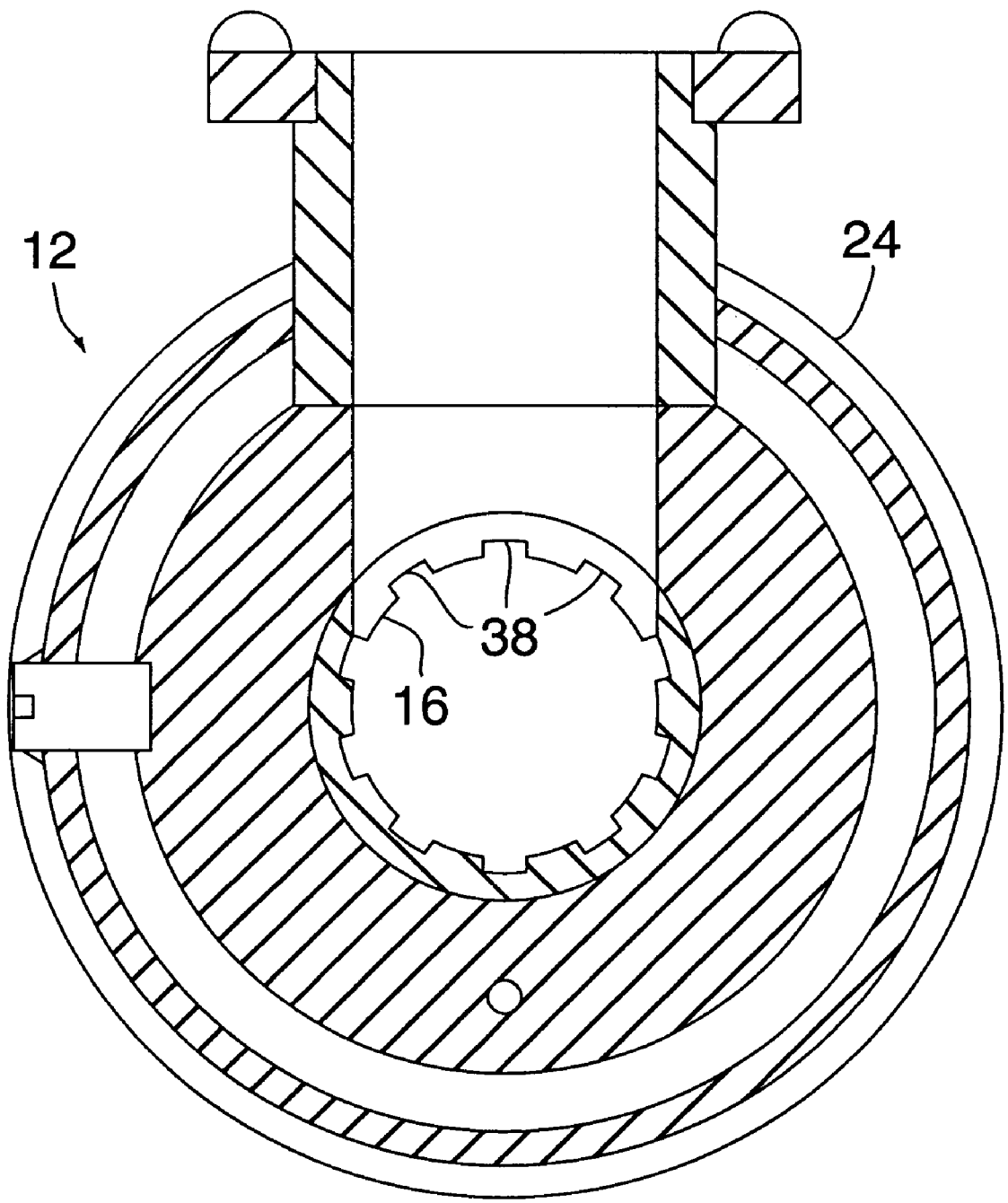
FIG. 2 is a partial cross sectional view of the extruder barrel of FIG. 1 showing the grooves defined by the feed section of the extruder barrel taken along line 2—2 of FIG. 1.

Referring to FIG. 2, in order to increase the pressure and thereby the throughput of the extruder 10, the bore wall 16 of the extruder barrel 12 defines a plurality of axially extending grooves 38 cut into the bore wall extending around the extruder screw 22. During operation of the extruder 10, the grooves 38 in the extruder barrel 12 create a large pressure gradient in the feed section 24 of the extruder screw 22. This pressure gradient causes an increase in the throughput of material in the extruder.

Figure 3:
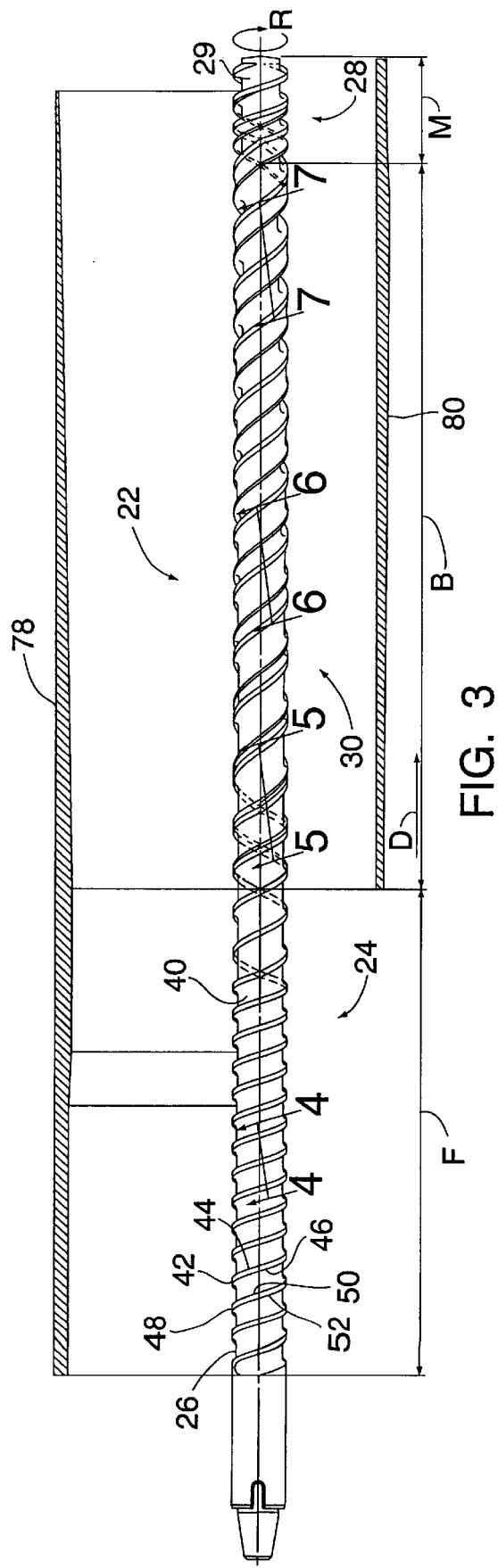
FIG. 3 is a partial side elevational view of the extruder screw of the present invention that also includes schematic illustrations of the depth of the solids and melt channels along the length of the screw.

Referring to FIG. 3 the extruder screw 22 includes a generally cylindrical screw body 40 having an extruding portion extending axially along the length of the screw. A first helical primary flight 42 defining a first advancing surface 44 and a first retreating surface 46, extends about and is coaxial with the screw body 40. In the illustrated embodiment, a second helical primary flight 48 defining a second advancing surface 50 and a second retreating surface 52, also extends about and is coaxial with the screw body 40. As shown in FIG. 3, both the first and second helical primary flights, 42 and 48 respectively, begin at the inlet end 26 of the extruder screw 22 and are spaced approximately 180° from one another. However, the present invention is not limited in this regard as the flights can start at angles other than 180° relative to each other. In addition, while first and second helical primary flights 42 and 48 respectively, are shown and described herein, the present invention is not limited in this regard as a single, or more than two primary flights can be employed without departing from the broader aspects of the present invention.

Figure 4:
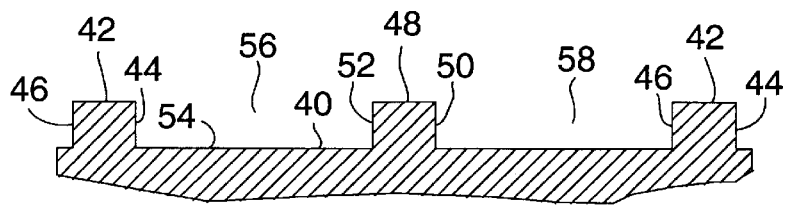
FIG. 4 is a partial cross-sectional view taken along lines 4—4 in FIG. 3, showing the two solids channels in the feed zone of the extruder screw of FIG. 3.

As shown in FIG. 4, the screw body 40 defines a first helical surface of revolution 54 that cooperates with the first advancing surface 44 and the second retreating surface 52 of the first and second primary flights, 42 and 48 respectively, to form a first solids channel 56. Similarly, the screw body 40 defines a second helical surface of revolution 57 that cooperates with the second advancing surface 50 and the first retreating surface 46 of the first and second primary flights, 48 and 42 respectively, to form a second solids channel 58.

Figure 5:
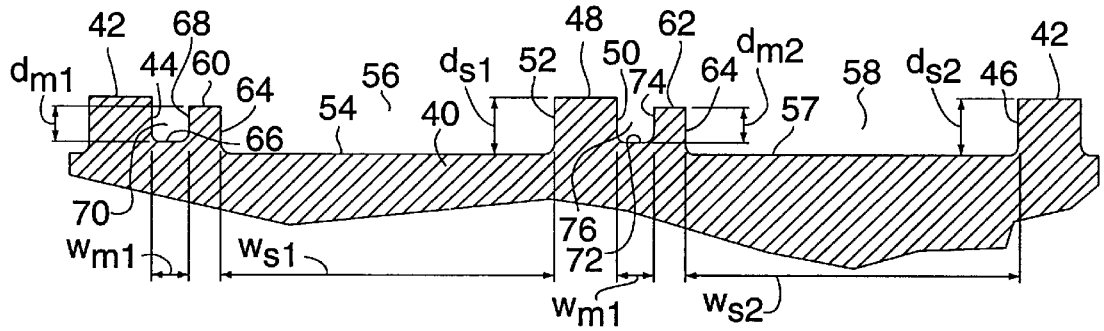
FIG. 5 is a partial cross-sectional view taken along lines 5—5 in FIG. 3, showing the two solids, and two melt channels in the beginning of the barrier zone of the extruder screw of FIG. 3.

Referring to FIG. 5, in the barrier section B, first and second barrier fights 60 and 62 each extend from a respective one of the first and second primary flights, 42 and 48 respectively. Each barrier flight 60 and 62, redefines a respective one of the first and second solid channels 56 and 58. Accordingly, the first solids channel 56 is now formed by the cooperation of the second retreating surface 52 of the second primary flight 48, the first helical surface of revolution 54 and an advancing surface 64 of the first barrier flight 60. Likewise, the second solids channel 58 is redefined by the cooperation of the retreating surface 46 of the first helical primary flight 42, the second surface of revolution 57, and an advancing surface 64 of the second barrier flight 62.

The screw body 40 defines a third helical surface of revolution 66 that cooperates with the first advancing surface 44 and a third retreating surface 60 of the first barrier flight 60 to define a first melt channel 70. Similarly, the screw body 40 defines a fourth helical surface of revolution 72 that cooperates with the second advancing surface 50, and a fourth retreating surface 74 of the second barrier flight 62 to define a second melt channel 76. As the solid resinous material advances in the downstream direction along the barrier section in the first and second solids channels 56 and 58 respectively, the material melts and migrates into the first and second melt channels, 70 and 76 respectively.

Figure 6:
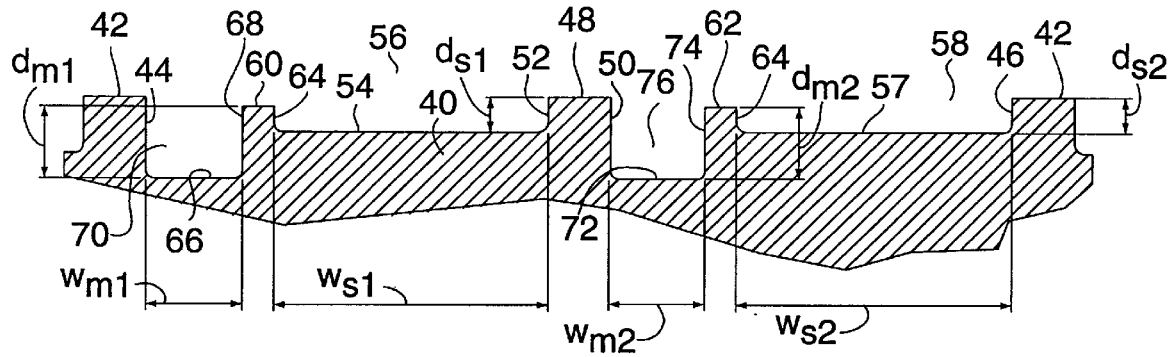
FIG. 6 is a partial cross-sectional view taken along lines 6—6 in FIG. 3, showing the two solids, and two melt channels approximately midway along the barrier zone of the extruder screw of FIG. 3.
Figure 7:
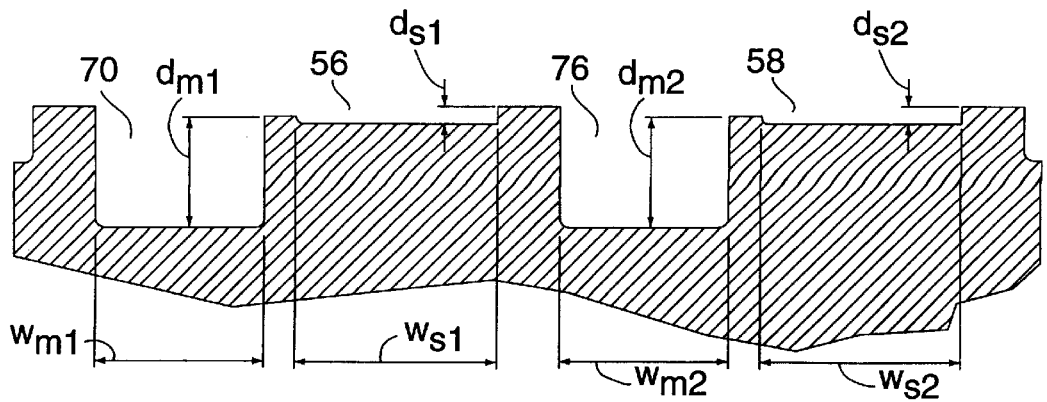
FIG. 7 is a partial cross-sectional view taken along lines 7—7 in FIG. 3, showing the two solids, and two melt channels at the end of the barrier zone furthest away from the feed zone of the extruder screw of FIG. 3.

As shown in FIGS. 5–7, the first and second solids channels, 56 and 58 respectively, each define a depth, $d_{s1}$ and $d_{s2}$ that progressively decreases along the barrier section in a downstream direction indicated by the arrow labeled "D" in FIG. 3. This phenomena is also illustrated graphically by the schematic representation 78 of the depth of the solids channels shown in FIG. 3. Like the solids channels, the first and second melt channels, 70 and 76 respectively, each define a depth $d_{m1}$ and $d_{m2}$ respectively, however, these depths increase in the downstream direction as illustrated graphically by the schematic representation 80 of the depth of the melt channels shown in FIG. 3.

In addition to the above-described variations in channel depth, the pitch of the primary flights, 42 and 48, and the barrier flights 60 and 62 also vary in the barrier section. This pitch variation causes the widths $w_{m1}$ and $w_{m2}$ defined by the first and second melt channels 70 and 76 respectively to increase along the barrier section in the downstream direction. At the same time, the widths $w_{s1}$ and $w_{s2}$ defined by the first and second solids channels also vary. Accordingly as one moves along the barrier section in the downstream direction, the first and second solids channels get narrower and shallower, and the first and second melt channels get wider and deeper.

Referring to FIGS. 1–7, the operation of the extruder screw 22 of the present invention will be described in detail. Solid resinous material, typically in the form of regrind, pellets, and/or powder is fed through the hopper 32 and into the hopper section 20 of the extruder barrel 12. The solid resinous material collects in the first and second solids channels 48 and 58 respectively and as a result of the rotation of the extruder screw 22 in the direction indicated by the arrow labeled "R", FIG. 3, the solid resinous material is conveyed along the feed section "F" to the barrier section "B". As the material moves along the feed section "F", the first and second advancing surfaces 44 and 50 respectively, of the first and second primary flights 42 and 48 engages the solid material therein causing it to compact into a solids bed. In addition, the plurality of grooves in the extruder barrel, which is usually temperature controlled, further compact and pressurize the material in the solids channels causing it to convey faster as well as to begin to melt. This melting action promotes the formation of melt pools adjacent to the advancing surfaces of the primary flights in the feed section of the extruder screw 22.

Once the material in the feed section enters the barrier section of the extruder screw 22, it continues to melt due to a combination of shearing in the material and heat from the extruder barrel 12. The molten material migrates over the barrier flights 60 and 62 from the first and second solids channels 56 and 58 respectively, into the first and second melt channels 70 and 76, respectively. This process continues along the barrier section in the downstream direction to the end thereof where the metering section of the extruder screw 22 feeds the molten material through the die 34.

While preferred embodiments have been shown and described, various modifications and substitutions may be made without departing from the spirit and scope of the invention. Accordingly, it is to be understood that the present invention has been described by way of example, and not by limitation.

What is claimed is:

1. An axially elongated extruder screw having a screw body including an axially extending extruding portion defined by a feed section at an inlet end of said screw, a metering section at an outlet end of said screw and a barrier section between said feed and metering sections, said extruder screw further comprising:

a first helical primary flight having a first advancing surface, and a first retreating surface, extending continuously about and coaxial with said screw body substantially along the entire length of said extruder screw;

a second helical primary flight extending continuously at least part-way along said feed section to said outlet end of said extruder screw and having a second advancing surface and a second retreating surface;

said screw body defining a first helical surface of revolution between said first advancing and second retreating surfaces, and cooperating therewith to define a first solids channel;

said screw body defining a second helical surface of revolution between said second advancing and first retreating surfaces, and cooperating therewith to define a second solids channel;

said barrier section including;

a first barrier flight having a third advancing and a third retreating surface, extending about and coaxial with said screw body along said barrier section, said first barrier flight being positioned between said first advancing and second retreating surfaces thereby causing said first helical surface of revolution to be redefined between said third advancing and second retreating surfaces;

said screw body defining a third helical surface of revolution between said first advancing and third retreating surfaces and cooperating therewith to form a first melt channel extending along said barrier section;

a second barrier flight having a fourth advancing and a fourth retreating surface, extending about and coaxial with said screw body along said barrier section, said second barrier flight being positioned between said second advancing surface and said first retreating surface thereby causing said second helical surface of revolution to be redefined between said fourth advancing and first retreating surfaces; and said screw body defining a fourth helical surface of revolution between said second advancing and fourth retreating surfaces and cooperating therewith to form a second melt channel extending along said barrier section.

2. An axially elongated extruder screw as defined by claim 1, wherein each of said first and second primary flights defines a pitch that varies along the length of said extruder screw.

3. An axially elongated extruder screw as defined by claim 1, wherein each of said first and second barrier flights defines a pitch that varies along the length of said extruder screw.

4. An axially elongated extruder screw as defined by claim 1, wherein each of said first and second melt channels defines a depth that progressively increases in a downstream direction along said barrier section.

5. An axially elongated extruder screw as defined by claim 1, wherein said first and second solids channels each defines a width that progressively decreases along said solids channels in a downstream direction along said barrier section.

6. An axially elongated extruder screw as defined by claim 1, wherein each of said first and second solids channels defines a depth that progressively decreases in a downstream direction along the melt channel.

7. An axially elongated extruder screw as defined by claim 1, wherein said first and second melt channels each defines a width that progressively increases in a downstream direction along said barrier section.

8. An extruder comprising:

an extruder drive;

an elongated extruder barrel mounted to said extruder drive and including a bore defined by a bore wall, said barrel having a hopper section adjacent to said extruder drive to allow the introduction of solid resinous material into said bore;

an axially elongated extruder screw having a screw body including an axially extending extruding portion defined by a feed section at an inlet end of said screw, a metering section at an outlet end of said screw and a barrier section between said feed and metering sections;

said extruder screw further comprising;

a first helical primary flight having a first advancing surface, and a first retreating surface, extending continuously about and coaxial with said screw body substantially along the entire length of said extruder screw;

a second helical primary flight extending continuously at least part-way along said feed section to said outlet end of said extruder screw and having a second advancing surface and a second retreating surface;

said screw body defining a first helical surface of revolution between said first advancing and second retreating surfaces, and cooperating therewith to define a first solids channel;

said screw body defining a second helical surface of revolution between said second advancing and first retreating surfaces, and cooperating therewith to define a second solids channel;

said barrier section including;

a first barrier flight having a third advancing and a third retreating surface, extending about and coaxial with said screw body along said barrier section, said first barrier flight being positioned between said first advancing and second retreating surfaces thereby causing said first helical surface of revolution to be redefined between said third advancing and second retreating surfaces;

said screw body defining a third helical surface of revolution between said first advancing and third retreating surfaces and cooperating therewith to form a first melt channel extending along said barrier section;

a second barrier flight having a fourth advancing and a fourth retreating surface, extending about and coaxial with said screw body along said barrier section, said second barrier flight being positioned between said second advancing surface and said first retreating surface thereby causing said second helical surface of revolution to be redefined between said fourth advancing and first retreating surfaces; and said screw body defining a fourth helical surface of revolution between said second advancing and fourth retreating surfaces and cooperating therewith to form a second melt channel extending along said barrier section; and a plurality of axial grooves defined by said bore wall adjacent to said hopper section of said barrel and extending proximate to said feed section of said extruder screw for increasing the feed rate and pressure of solid resinous material in said feed section during operation of said extruder.

* * * * *

UNITED STATES PATENT AND TRADEMARK OFFICE
CERTIFICATE OF CORRECTION

PATENT NO. : 6,139,179
DATED : October 31, 2000
INVENTOR(S) : Christiano et al.

It is certified that error appears in the above-identified patent and that said Letters Patent is hereby corrected as shown below:

Column 2, Line 16: After "material to a", delete "molter" and substitute --molten--.

Column 4, Line 25: After "outlet end", insert --29--.

Column 5, Line 12: After "flights", delete "48 and 42" and substitute --42 and 48--.

Column 5, Line 29: After "retreating surface", delete "60" and substitute --68--.

Signed and Sealed this

Eighth Day of May, 2001

Attest:

NICHOLAS P. GODICI

*Attesting Officer*      *Acting Director of the United States Patent and Trademark Office*